United States Patent
Pinney et al.

(10) Patent No.: US 10,480,451 B2
(45) Date of Patent: Nov. 19, 2019

(54) SYSTEMS AND METHODS FOR RESTRICTING MOVEMENT IN FLEXIBLE DUCTS

(71) Applicant: THE BOEING COMPANY, Huntington Beach, CA (US)

(72) Inventors: Thomas Richardson Pinney, Long Beach, CA (US); Michael Best, Huntington Beach, CA (US); Jonathan D. Embler, Tustin, CA (US); William P. Keith, Lakewood, CA (US); Aristidis Sidiropoulos, Huntington Beach, CA (US); Edward T. Tong, Palo Verdes Peninsula, CA (US)

(73) Assignee: THE BOEING COMPANY, Chicago, IL (US)

( * ) Notice: Subject to any disclaimer, the term of this patent is extended or adjusted under 35 U.S.C. 154(b) by 154 days.

(21) Appl. No.: 14/689,265

(22) Filed: Apr. 17, 2015

(65) Prior Publication Data
US 2016/0305369 A1 Oct. 20, 2016

(51) Int. Cl.
*F02K 1/48* (2006.01)
*F02K 1/46* (2006.01)

(52) U.S. Cl.
CPC .................................. *F02K 1/46* (2013.01)

(58) Field of Classification Search
None
See application file for complete search history.

(56) References Cited

U.S. PATENT DOCUMENTS

| | | | | |
|---|---|---|---|---|
| 4,215,536 A | * | 8/1980 | Rudolph | F02K 1/386 181/213 |
| 4,335,801 A | * | 6/1982 | Stachowiak | F02K 1/48 181/213 |
| 5,265,807 A | * | 11/1993 | Steckbeck | F02K 1/48 181/213 |
| 6,606,854 B1 | * | 8/2003 | Siefker | B63G 13/02 181/213 |
| 7,017,332 B2 | * | 3/2006 | Oishi | F02K 1/386 239/265.17 |
| 7,607,306 B2 | | 10/2009 | Steyer et al. | |
| 7,836,682 B2 | | 11/2010 | Rasheed et al. | |
| 8,438,835 B2 | | 5/2013 | Perveiler et al. | |
| 2008/0115484 A1 | * | 5/2008 | Conete | F02K 1/48 60/262 |
| 2008/0121301 A1 | * | 5/2008 | Norris | F01D 25/30 138/39 |

(Continued)

FOREIGN PATENT DOCUMENTS

JP 11002156 A * 1/1999 ............... F02K 1/48

*Primary Examiner* — Steven M Sutherland
(74) *Attorney, Agent, or Firm* — Armstrong Teasdale LLP (57) ABSTRACT

Methods and systems for restricting movement in a flow mixer including a plurality of lobes that each includes a trough, using a stiffener mechanism, are provided. The stiffener mechanism includes a first end portion configured to be coupled to a first lobe of the plurality of lobes and a second end portion configured to be coupled to a second lobe of the plurality of lobes. The stiffener mechanism also includes a body portion coupled between the first end portion and the second end portion such that the body portion is configured to restrict movement of the first and second lobes.

14 Claims, 7 Drawing Sheets

(56) References Cited

U.S. PATENT DOCUMENTS

| | | | | |
|---|---|---|---|---|
| 2011/0036068 A1* | 2/2011 | Lefebvre | ............... | F01D 9/04 |
| | | | | 60/262 |
| 2013/0336794 A1* | 12/2013 | Armstrong | ............ | F01D 9/00 |
| | | | | 416/189 |
| 2014/0241863 A1* | 8/2014 | Tardif | ................ | F01D 25/24 |
| | | | | 415/145 |

* cited by examiner

SYSTEMS AND METHODS FOR RESTRICTING MOVEMENT IN FLEXIBLE DUCTS

STATEMENT REGARDING FEDERALLY SPONSORED RESEARCH & DEVELOPMENT

This disclosure was made with Government support under Technology Investment Agreement contract W911W6-13-2-0003 awarded by the Department of Defense. The government has certain rights in this invention.

BACKGROUND

This invention relates generally to systems and methods for restricting movement in flexible ducts, and, more generally, to methods and systems for increasing the natural frequency of a flexible duct.

Exhaust systems for rotorcraft or other vehicles may require features that mix hot exhaust air and cooler ambient air to limit temperatures of the surrounding vehicle structure or to limit the heat signature of the vehicle. One method of achieving cooler exhaust temperatures is to attach a flow mixer to the outlet of the exhaust system. At least some known flow mixers include a plurality of lobes, or "flutes" that promote mixing of the two air streams. A drawback of a lobed or fluted design is that the stiffness of the flow mixer is necessarily reduced. At engine or rotor frequencies that align with the natural frequency of the flow mixer, the flow mixer is subject to high vibrational loads that cause deflections in the flow mixer structure. The alignment of natural frequencies and rotor frequencies (resonance) leads to increased deflection and stresses that severely limit or prohibit a lobed design. Further, static or dynamic pressures on the walls of the lobes may cause large deflections in the lobe areas and negatively impact flow mixing.

Duct size is a significant driver of natural frequency. At least some known exhaust systems use relatively small size flow mixers that potentially avoid critical frequencies without additional stiffening features. However, such small size flow mixers enable less efficient mixing of hot exhaust air and cooler ambient air. Furthermore, at least some known exhaust systems may use multiple small size flow mixers to increase the mixing efficiency. However, multiple flow mixers increases the manufacturing and maintenance costs associated therewith and also increases the weight of the exhaust system.

BRIEF DESCRIPTION

In one aspect, a stiffener mechanism is provided. The stiffener mechanism is configured for use with a flow mixer that includes a plurality of lobes each having a trough. The stiffener mechanism includes a first end portion configured to be coupled to a first lobe of the plurality of lobes and a second end portion configured to be coupled to a second lobe of the plurality of lobes. The stiffener mechanism also includes a body portion coupled between the first end portion and the second end portion such that the body portion is configured to restrict movement of the first and second lobes.

In another aspect, an aircraft exhaust system is provided. The aircraft exhaust system includes a flow mixer and at least one stiffener mechanism coupled to the flow mixer. The flow mixer includes a plurality of upper lobes that each includes a pair of opposing upper sidewalls and an upper trough extending between the pair of upper sidewalls. The flow mixer further includes a plurality of lower lobes that each includes a pair of opposing lower sidewalls and a lower trough extending between the pair of lower sidewalls. A stiffener mechanism is coupled between at least one pair of corresponding upper lobe and lower lobe such that the stiffener mechanism is configured to restrict movement of the upper and lower lobes.

In yet another aspect, a method of increasing the resonant frequency of a flow mixer is provided. The flow mixer includes a plurality of lobes that each includes a trough and a pair of sidewalls. The method includes coupling a first end portion of a stiffening mechanism to a first lobe of the plurality of lobes and coupling a second end portion of the stiffening mechanism to a second lobe of the plurality of lobes. The method also includes coupling a body portion of the stiffening mechanism between the first end portion and the second end portion such that the body portion restricts movement of the first and second lobes.

The features, functions, and advantages that have been discussed can be achieved independently in various examples or may be combined in yet other examples, further details of which can be seen with reference to the following description and drawings.

DETAILED DESCRIPTION

Figure 1:
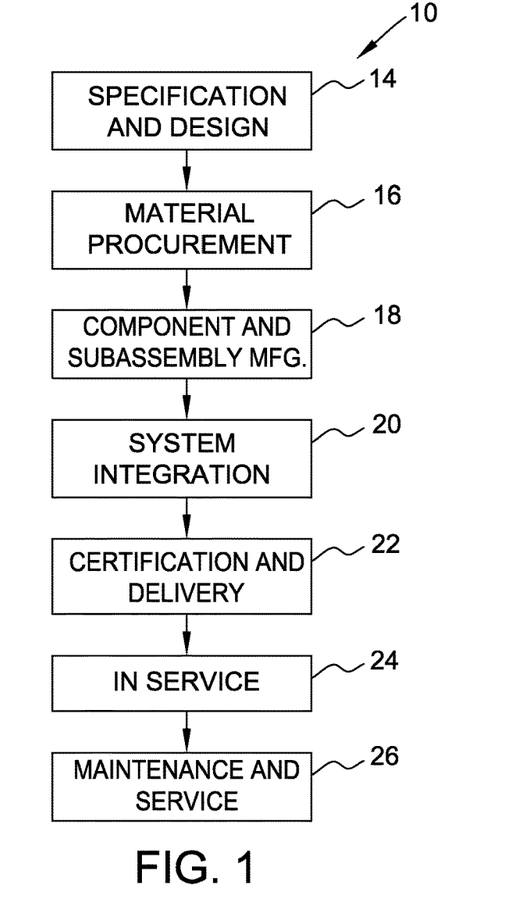
FIG. 1 is a flow diagram of an exemplary aircraft production and service methodology.
Figure 2:
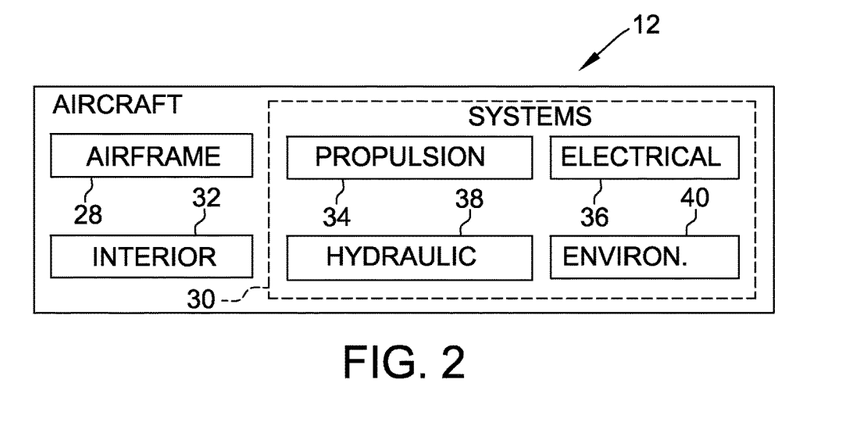
FIG. 2 is a block diagram of an exemplary aircraft.

Referring FIG. 1, implementations of the disclosure may be described in the context of an aircraft manufacturing and service method 10 and via an aircraft 12 (shown in FIG. 2). During pre-production, including specification and design 14 data of aircraft 12 may be used during the manufacturing process and other materials associated with the airframe may be procured 16. During production, component and subassembly manufacturing 18 and system integration 20 of aircraft 12 occurs, prior to aircraft 12 entering its certification and delivery process 22. Upon successful satisfaction and completion of airframe certification, aircraft 12 may be placed in service 24. While in service by a customer, aircraft 12 is scheduled for periodic, routine, and scheduled maintenance and service 26, including any modification, reconfiguration, and/or refurbishment, for example. In alternative implementations, manufacturing and service method 10 may be implemented via vehicles other than an aircraft.

Each portion and process associated with aircraft manufacturing and/or service 10 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 12 produced via method 10 may include an airframe 28 having a plurality of systems 30 and an interior 32. Examples of high-level systems 30 include one or more of a propulsion system 34, an electrical system 36, a hydraulic system 38, and/or an environmental system 40. Any number of other systems may be included.

Apparatus and methods embodied herein may be employed during any one or more of the stages of method 10. For example, components or subassemblies corresponding to production process 18 may be fabricated or manufactured in a manner similar to components or subassemblies produced while aircraft 12 is in service. Also, one or more apparatus implementations, method implementations, or a combination thereof may be utilized during the production stages 18 and 20, for example, by substantially expediting assembly of, and/or reducing the cost of assembly of aircraft 12. Similarly, one or more of apparatus implementations, method implementations, or a combination thereof may be utilized while aircraft 12 is being serviced or maintained, for example, during scheduled maintenance and service 26.

As used herein, the term "aircraft" may include, but is not limited to, airplanes, unmanned aerial vehicles (UAVs), gliders, helicopters, spacecraft, reusable launch vehicles, and/or any other object that travels through airspace. Further, in an alternative implementation, the aircraft manufacturing and service method described herein may be used in any manufacturing and/or service operation.

Figure 3:
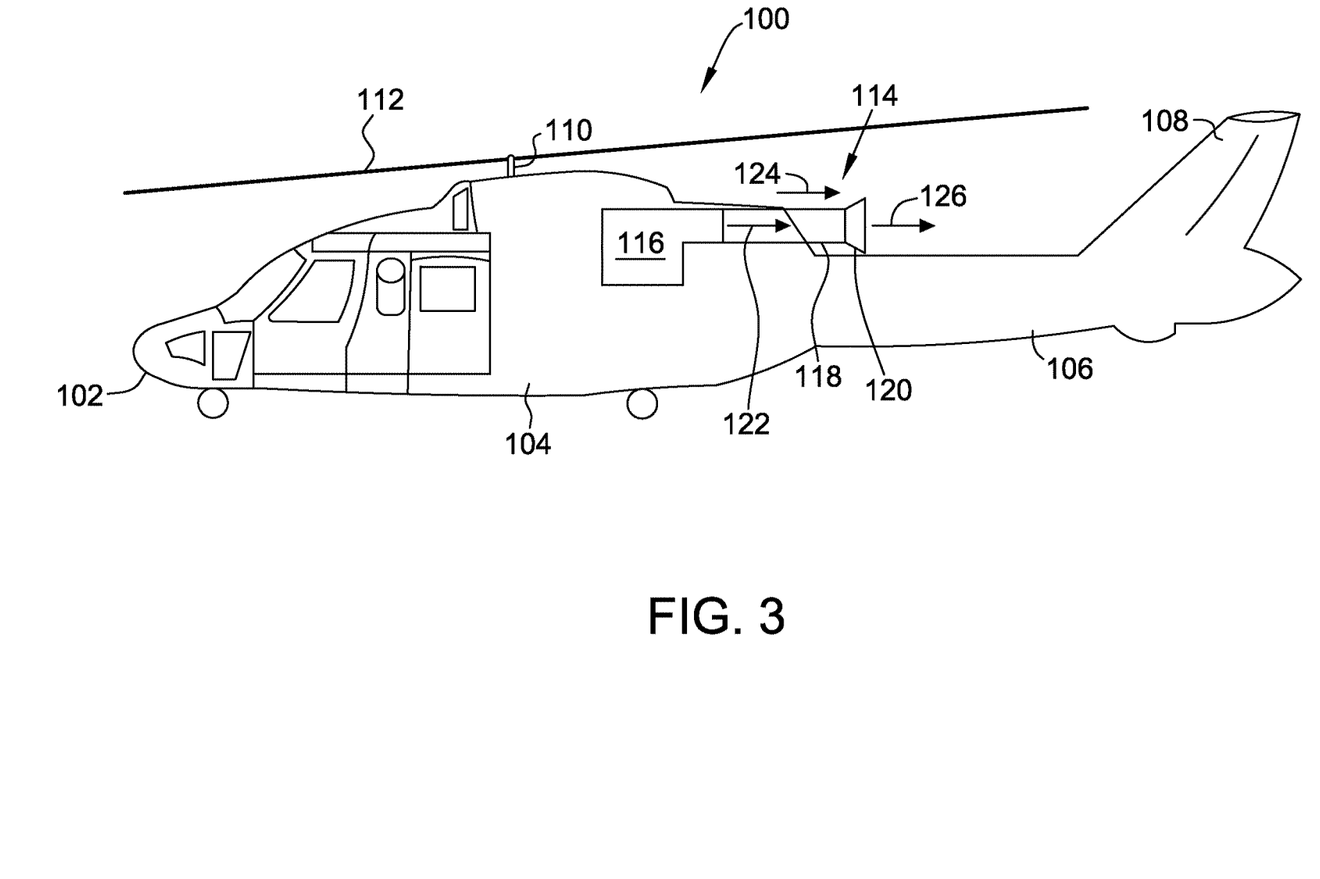
FIG. 3 is a side view of an exemplary aircraft including an exemplary exhaust system.

Referring now to FIG. 3, an aircraft 100 is illustrated. Aircraft 100 is likened to aircraft 12 described in FIG. 1 and FIG. 2. In the exemplary implementation, aircraft 100 is a rotorcraft. In another suitable embodiment, the aircraft 100 may be vehicle that travels through airspace, such as, but not limited to, airplanes, unmanned aerial vehicles (UAVs), gliders, helicopters, spacecraft, and reusable launch vehicles. Furthermore, although the embodiments described herein are described as related to an aircraft, it is contemplated that aircraft 100 may be any ground vehicle or waterborne vessel.

In the exemplary implementation, aircraft 100 is a rotorcraft including a nose 102, a body 104, a boom 106, and a tail 108. A rotorshaft 110 extends outward from body 104 and is coupled to at least one rotor 112 that rotates about rotorshaft 110 to provide aircraft 100 with lift and thrust. Aircraft 100 also includes an exhaust system 114 that includes an engine 116, an exhaust duct 118, and a flow mixer 120. Engine 116 is generally located in body portion 104 and is coupled to rotorshaft 110 such that engine 116 provides the power necessary to spin rotorshaft 110. During operation, engine 116 generates hot exhaust gases 122 that are channeled through exhaust duct 118 and discharged from aircraft through flow mixer 120 to the relatively cooler ambient air 124. Flow mixer 120 is configured to mix the flows of exhaust gas 122 and ambient air 124 to produce a gas mixture 126 that reduces the effect of hot exhaust gas 122 impinging on downstream components of aircraft 100, such as boom 106 and tail 108. Mixing of exhaust gas 122 and ambient air 124 also facilitates reducing the heat signature of aircraft 100 to mask aircraft 100 from detection and heat seeking weapons.

Figure 4:
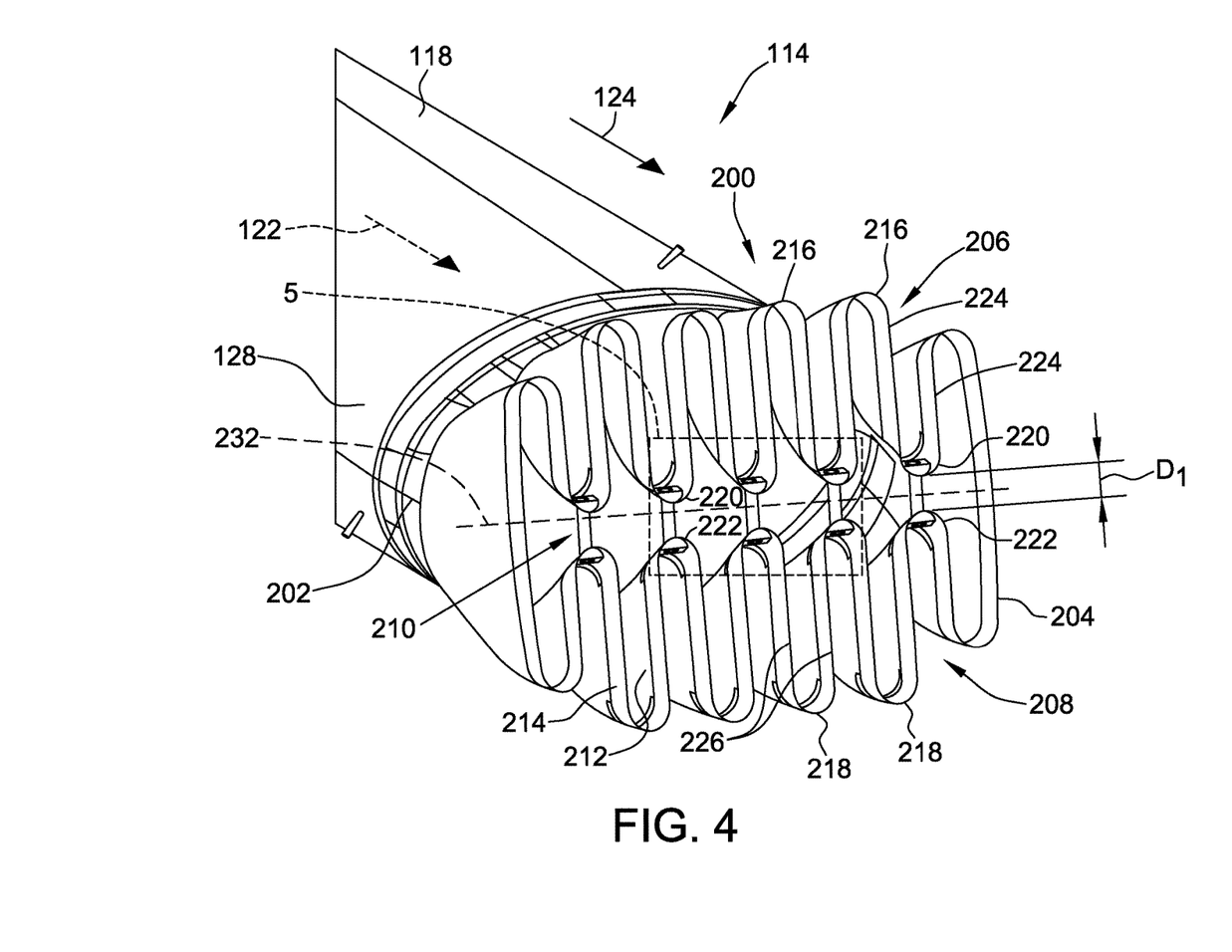
FIG. 4 is a perspective view of a portion of the exhaust system shown in FIG. 3 illustrating an exhaust duct and an exemplary flow mixer.

FIG. 4 is a perspective view of a portion of exhaust system 114 illustrating exhaust duct 118 and an exemplary flow mixer 200. Flow mixer 200 is one implementation of flow mixer 120 that may be used with exhaust system 114. In the implementation shown in FIG. 4, mixer 200 is fabricated from a ceramic matrix composite (CMC) material that is able to repeatedly withstand exposure to hot exhaust gases 122. In another suitable implementation, mixer 200 is fabricated from a metallic or metal alloy material. Generally, mixer 200 may be fabricated from any material that facilitates operation of exhaust system 114 as described herein. In the exemplary implementation, flow mixer 200 includes an inlet end 202 and an outlet 204 end. Inlet end 202 is coupled to an outlet end 128 of exhaust duct 118. In the exemplary embodiment, outlet end 204 transitions gradually from the substantially elliptical shape of inlet end 202 to a lobed shape that facilitates mixing hot exhaust flow 122 from exhaust duct 118 with cooler ambient air. Outlet end 204 of flow mixer 200 includes a plurality of lobes that are spaced circumferentially about outlet end 204. More specifically, in the exemplary implementation, outlet end 204 includes a plurality of upper lobes 206 and a plurality of lower lobes 208 that are spaced from one another in two horizontal rows perpendicular to the plane of outlet 204. Upper lobes 206 are spaced from lower lobes 208 by a predetermined distance D1 such that a gap 210 is defined therebetween. In another suitable implementation, mixer 200 may be oriented 90 degrees from that shown such that outlet end 204 includes two substantially vertical rows of lobes. Generally, mixer 200 may be oriented in any manner that facilitates operation of mixer as described herein.

Outlet end 204 is formed by continuous inner and outer surfaces 212 and 214, respectively, which form a plurality of vertically-oriented, alternating lobe peaks and lobe troughs. More specifically, upper lobes 206 includes upper peaks 216 and lower lobes 208 include lower peaks 218, while upper lobes 206 include upper troughs 220 and lower lobes 208 include lower troughs 222. In the exemplary embodiment, upper lobes 206 also include a plurality of sidewalls 224 that are oriented substantially vertically and are parallel each adjacent sidewall 224. In another suitable implementation, sidewalls 224 may have any orientation and may not be parallel to an adjacent sidewall 224. Each peak 216 extends between a pair of adjacent sidewalls 224, and, similarly, each trough 220 extends between an adjacent pair of sidewalls 224 such that one peak 216 and an adjacent trough 220 share a common sidewall 224. Similarly, with respect to lower lobes 208, each peak 218 extends between a pair of adjacent sidewalls 226, and, similarly, each trough 222 extends between an adjacent pair of sidewalls 226 such that one peak 218 and an adjacent trough 222 share a common sidewall 226.

In the exemplary implementation flow mixer 200 is configured such that each upper lobe 206 is oriented in parallel with a lower lobe 208. That is, each upper lobe 206 of the plurality of upper lobes 206 is aligned with a corresponding lower lobe 208 of the plurality of lower lobes 208. More specifically, an apex 228 (shown in FIG. 5) of each upper trough 220 is aligned with an apex 230 (shown in FIG. 5) of a corresponding lower trough 222 such that apexes 228 and 230 are spaced apart by predetermined distance D1. Because upper troughs 220 are aligned with a corresponding lower trough 222, it follows that each upper peak 216 is aligned with a corresponding lower peak 218 and that upper sidewalls 224 are aligned with lower sidewalls 226.

Peaks 216 and 218 and troughs 220 and 222 facilitate mixing cool ambient air 124 with hot exhaust gas 122 to form a steady and spatially uniform combined air flow 126 (shown in FIG. 3). In operation, ambient air flow 124 is directed along exhaust duct 118 and around peaks 216 and 218 and through troughs 220 and 222 where at least a portion of ambient air flow 124 is directed towards an axis 232, simultaneously, hot exhaust gas 122 is directed through exhaust duct 118 and through peaks 216 and 218 and around troughs 220 and 222 where at least a portion of hot exhaust gas 122 is directed towards axis 232. Peaks 216 and 218 and troughs 220 and 222 substantially vertically "slice" each respective air flow 124 and 122 to facilitate mixing flows 122 and 124 into combined flow 126 that is cooler than hot exhaust gas flow 122.

Figure 5:
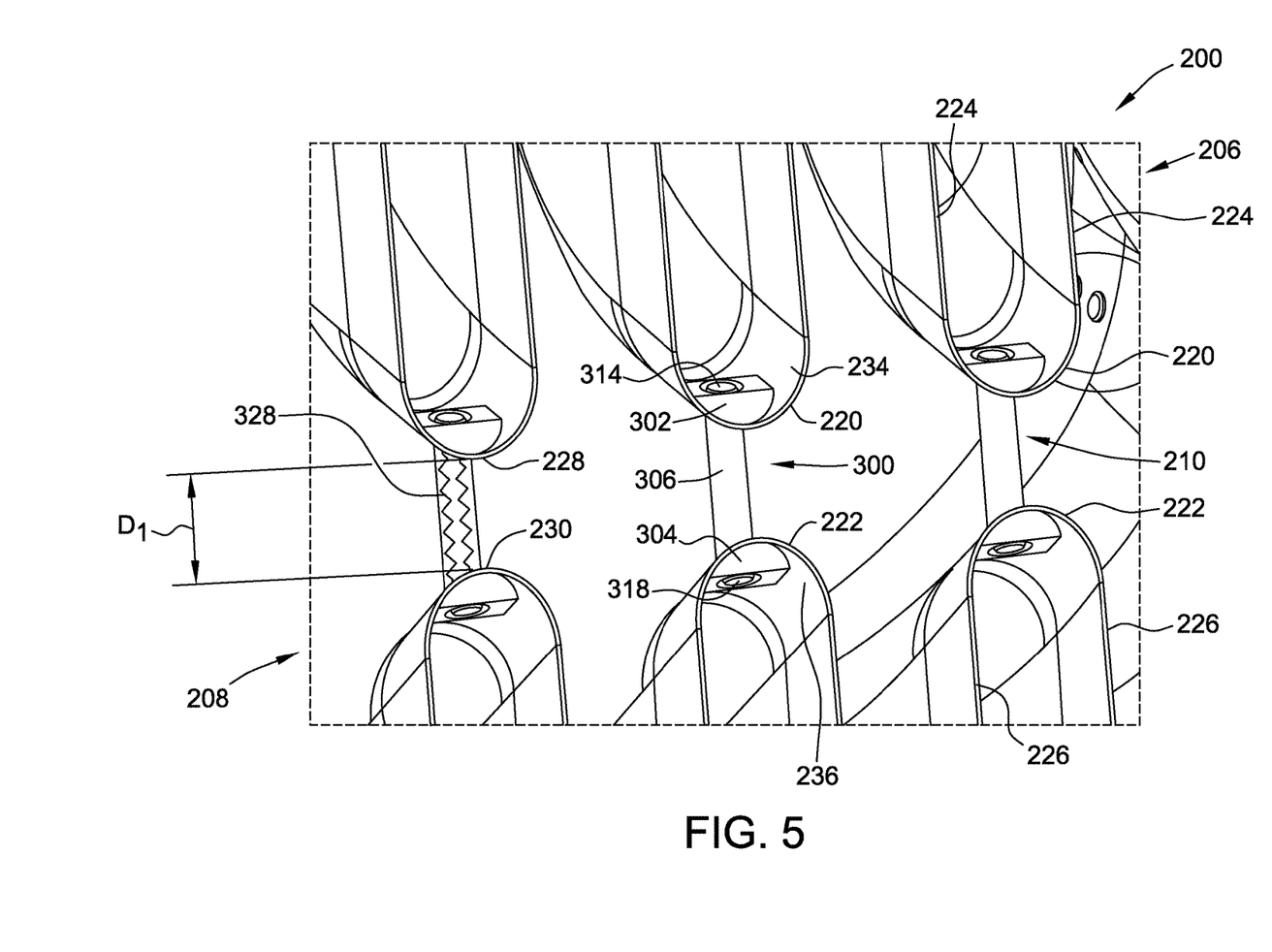
FIG. 5 is an enlarged view of a portion of the flow mixer shown in FIG. 4 illustrating an exemplary stiffener.
Figure 6:
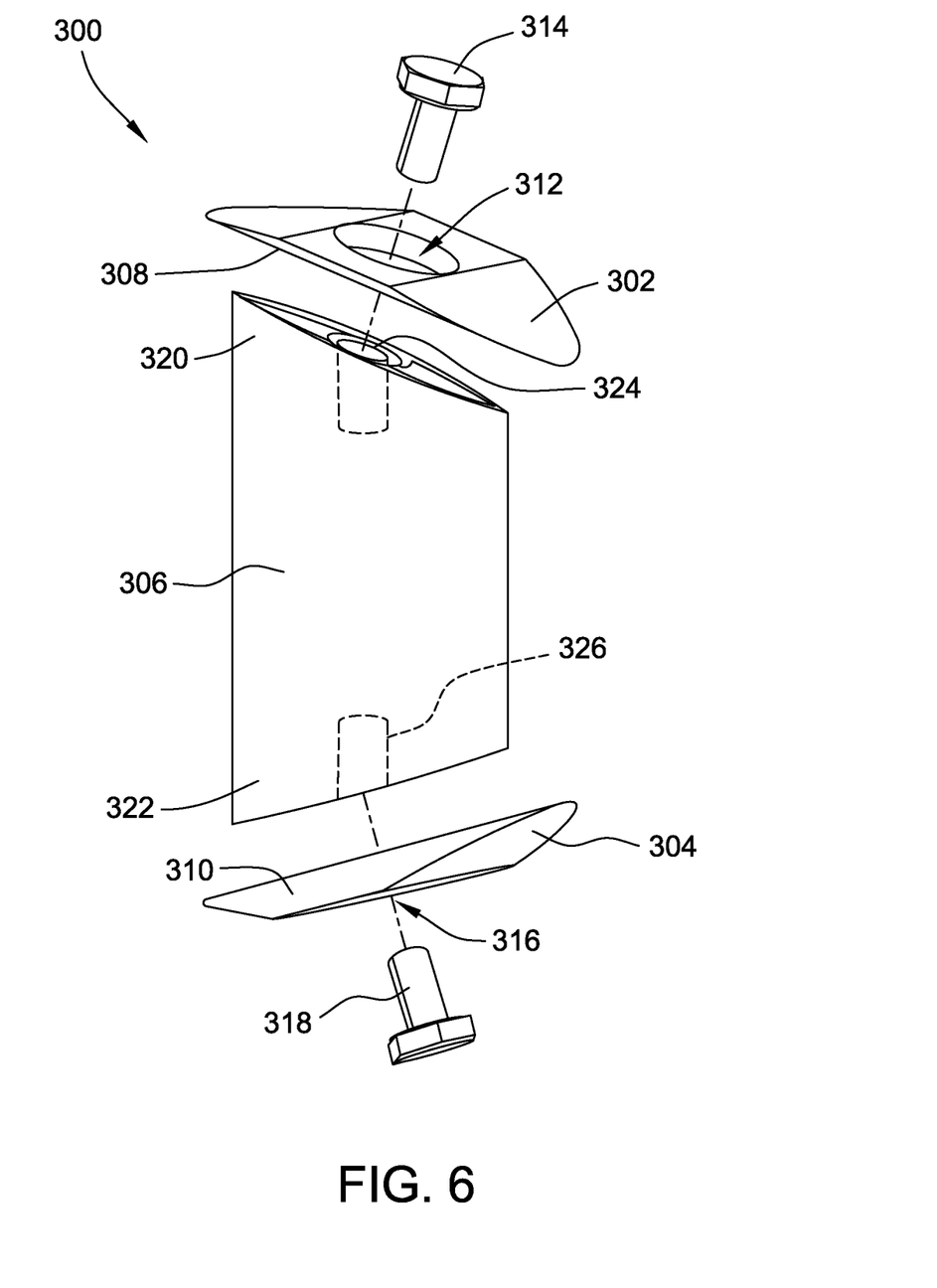
FIG. 6 is an exploded view of the stiffener shown in FIG. 5.

FIG. 5 is an enlarged view of a portion 5 of flow mixer 200 illustrating an exemplary stiffener mechanism 300 that may be used with flow mixer 200, and FIG. 6 is an exploded view of stiffener mechanism 300. Stiffener mechanism 300 is coupled between an upper lobe 206 and a corresponding lower lobe 208, and, more specifically, between an upper trough 220 and a corresponding lower trough 222. In such a configuration, stiffener mechanism 300 restricts movement of upper and lower lobes 220 and 222 with respect to each other. Connection of lobes 206 and 208 facilitates raising the natural frequency of flow mixer 200 sufficiently to prevent or avoid deflections of lobes 206 and 208 resulting from resonance with a rotor frequency. Although stiffener mechanism 300 is described herein as extending between corresponding upper and lower sets of lobes 206 and 208 of flow mixer 200, it is contemplated that stiffener mechanism 300 may be used on any lobed flow mixer and is not limited to use with only flow mixer 200 as described herein. For example, stiffener mechanism 300 may extend between two or more lobes of a substantially radial flow mixer having circumferentially-spaced lobes. In such a configuration, stiffener mechanism 300 may extend between any number of lobes and is not restricted to extending between only two such lobes.

In the exemplary implementation, stiffener 300 includes an upper cap 302, a lower cap 304, and a body portion 306 coupled between upper and lower caps 302 and 304. One upper cap 302 is positioned within an upper trough 220 of each pair of opposing upper and lower troughs 220 and 222 such that an arcuate bottom surface 308 of upper cap 302 is in contact with a substantially complementary arcuate surface 234 of upper trough 220. Similarly, one lower cap 304 is positioned within a lower trough 222 of each pair of opposing upper and lower troughs 220 and 222 such that an arcuate bottom surface 310 of lower cap 304 is in contact with a substantially complementary arcuate surface 236 of lower trough 222. Furthermore, each upper cap 302 includes an opening 312 defined therethrough that is configured to receive an upper fastener 314 inserted therein. Similarly, each lower cap 304 includes an opening 316 defined therethrough that is configured to receive a lower fastener 318 inserted therein. Each opening 312 and 316 is counter-bored such that the top of each fastener 314 and 318 is substantially flush with a top surface of a respective cap 302 and 304. As such, caps 302 and 304 and fasteners 314 and 318 have a substantially thin profile within respective upper and lower troughs 220 and 222. The thin profile of caps 302 and 304 facilitates a smooth airflow flowing over the top of caps 302 and 304 such that caps 302 and 304 do not interfere with the performance of flow mixer 200. In some implementations, each of upper and lower caps 302 and 304 include at least one flow mixing feature that facilitates efficient mixing of hot exhaust gas 122 with ambient air 124.

In the exemplary implementation, body portion 306 of stiffener mechanism 300 includes an upper end 320 coupled to upper trough 220 and a lower end 322 coupled to lower trough 222. Upper end 320 includes an upper opening 324 that is aligned with opening 312 in upper cap 302 such that upper fastener 314 is inserted through opening 312, through upper trough 220, and into opening 324. As such, at least a portion of upper trough 220 is coupled between upper cap 302 and upper end 320 of body 306. Similarly, lower end 322 includes a lower opening 326 that is aligned with opening 316 in lower cap 314 such that lower fastener 318 is inserted through opening 314, through lower trough 222, and into opening 326. As such, at least a portion of lower trough 222 is coupled between lower cap 304 and lower end 322 of body 306. In such a configuration, each of fasteners 314 and 316 are oriented substantially parallel to respective sidewalls 224 and 226, fasteners 314 and 316 are subjected to primarily tension and/or compression loading when upper and lower lobes 206 and 208 are subjected to stresses that would cause deflections if not for stiffener mechanism 300.

In the exemplary implementation, body portion 306 includes a substantially airfoil-shaped cross-sectional profile, as best shown in FIG. 6 such as not to impede the flow of enable hot exhaust gas 122 through outlet 204. As such, body portion 306 facilitates maintaining the aerodynamic and performance features of flow mixer 200. In another suitable embodiment, body portion 306 includes any cross-sectional profile shape that enables flow mixer 200 to operate as described herein. Furthermore, in one implementation, body portion 306 includes at least one flow mixing feature 328 that facilitates efficient mixing of hot exhaust gas 122 with ambient air 124.

In the implementation shown in FIG. 5 and FIG. 6, stiffener mechanism 300 is fabricated from a metallic or metal alloy material that is able to repeatedly withstand exposure to hot exhaust gases 122. In another suitable implementation, stiffener mechanism 300 is fabricated from a CMC material. Generally, stiffener mechanism 300 may be fabricated from any material that facilitates operation of exhaust system 114 as described herein. Furthermore, in one implementation, body portion 306 may be fabricated from a different material than upper and lower caps 302 and 304. The in exemplary implementation, body portion 306 is removable from caps 302 and 304 and from flow mixer 200 to enable replacement thereof due to impact events or prolonged exposure. Additionally, body portion 306 may be substantially hollow with the exception of where fasteners 314 and 318 are inserted therein. Such a hollow structure reduces the weight of stiffener mechanism 300 and may be fabricated using a 3-dimensional printing process of any material described above.

Although FIG. 4 and FIG. 5 depict a stiffener mechanism 300 between each pair or corresponding upper and lower lobes 206 and 208, it is contemplated that flow mixer 200 may include fewer stiffener mechanisms 300, such as at only every other pair of lobes 206 and 208 or only a stiffener mechanism 300 at the ends of each plurality of lobes 206 and 208. Generally, flow mixer 200 may include any number of stiffener mechanisms 300 that enable exhaust system 114 to operate as described herein.

Figure 7:
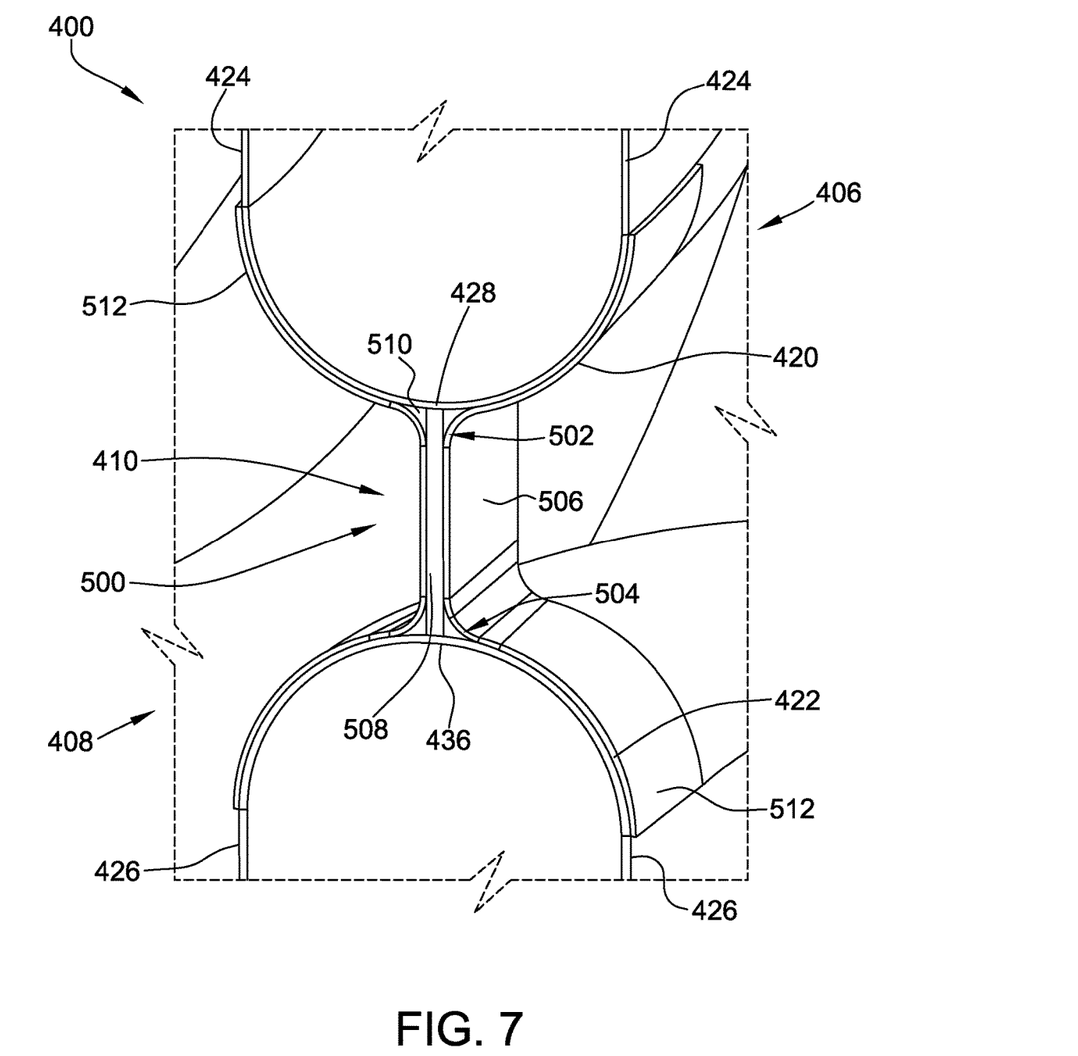
FIG. 7 is an enlarged view of an alternative flow mixer including an alternative stiffener embodiment.

FIG. 7 illustrates an alternative implementation of a flow mixer 400 for use in exhaust system 114 (shown in FIG. 3) that includes an alternative implementation of a stiffener mechanism 500. Flow mixer 400 is substantially similar to flow mixer 200 (shown in FIG. 4 and FIG. 5) in operation and structure, with the exception that stiffener mechanism 500 is integrally formed with flow mixer 400, rather than being a separate attachable component, as stiffener mechanism 300 (shown in FIG. 5 and FIG. 6). As such, components of flow mixer 400 shown in FIG. 7 are labeled with similar reference numbers as those used in FIG. 4 with the exception that the reference numbers are in the 400 series. Flow mixer 400 with stiffener mechanism 500 may be substituted for flow mixer 200 with stiffener mechanism 300 within exhaust system 114.

In the implementation shown in FIG. 7, flow mixer 400 is fabricated from a ceramic matrix composite (CMC) material that is able to repeatedly withstand exposure to hot exhaust gases 122. Alternatively, mixer 400 is formed from a metallic or metal alloy material. Flow mixer 400 includes a plurality of upper lobes 406 and a plurality of lower lobes 408 that are spaced from one another to define a gap 410 therebetween. As described above, upper lobes 406 include upper troughs 420 and lower lobes 408 include lower troughs 422. In the exemplary embodiment, upper lobes 406 also include a plurality of sidewalls 424 that are oriented substantially vertically and are parallel each adjacent sidewall 424. Each trough 420 extends between an adjacent pair of sidewalls 424 such that an upper peak (not shown) and an adjacent upper trough 420 share a common sidewall 424. Similarly, with respect to lower lobes 408, each trough 422 extends between an adjacent pair of sidewalls 426 such that a lower peak (not shown) and an adjacent lower trough 422 share a common sidewall 426.

In the exemplary implementation flow mixer 400 is configured such that each upper lobe 406 is oriented with a corresponding lower lobe 408. More specifically, an apex 428 of each upper trough 420 is aligned with an apex 430 of a corresponding lower trough 422 such that apexes 428 and 430 are spaced apart by gap 410. Because upper troughs 420 are aligned with a corresponding lower trough 422, it follows that upper sidewalls 424 are aligned with lower sidewalls 426.

Stiffener mechanism 500 is coupled between an upper lobe 406 and a corresponding lower lobe 408, and, more specifically, between an upper trough 420 and a corresponding lower trough 422. In such a configuration, stiffener mechanism 500 restricts movement of upper and lower lobes 420 and 422 with respect to each other.

In the implementation shown in FIG. 7, stiffener mechanism 500 includes an upper end 502, a lower end 504, and a body portion 506 extending therebetween. In the exemplary implementation, body portion 506 is integrally formed with ends 502 and 506. Additionally, upper end 502 is integrally formed with upper trough 420 and a lower end 504 that is integrally formed with lower trough 422. More specifically, upper end 502 is integrally formed at apex 428 of upper trough 420, and, similarly, lower end 504 is integrally formed at apex 430 of lower trough 422 such that stiffener mechanism 500 spans gap 410. As stiffener mechanism 500 is integrally formed with flow mixer 400, stiffener mechanism 500 is fabricated from the same material as flow mixer 400. More specifically, when flow mixer 400 and stiffener mechanism 500 are both formed from a CMC material, mixer 400 and mechanism 500 are formed during the lay-up process. Alternatively, when flow mixer 400 and stiffener mechanism 500 are both formed from a metallic or metal alloy material, mixer 400 and mechanism 500 are one of integrally formed during molding or welded together.

Stiffener mechanism 500 also includes an inner segment 508 and a plurality of spacers, or noodles, 510 coupled to segment 508. Inner segment 508 makes up a portion of ends 502 and 504 and also body portion 506, while two spacers 510 partially form each of ends 502 and 508. Spacers 510 are coupled between a respective trough 420 or 422 and inner segment 508 to provide a substantially smooth transition therebetween. A layer of a skin 512 is laid over a portion of corresponding troughs 420 and 422, spacers, 510, and inner segment 508 on each side of stiffener mechanism 500.

Figure 8:
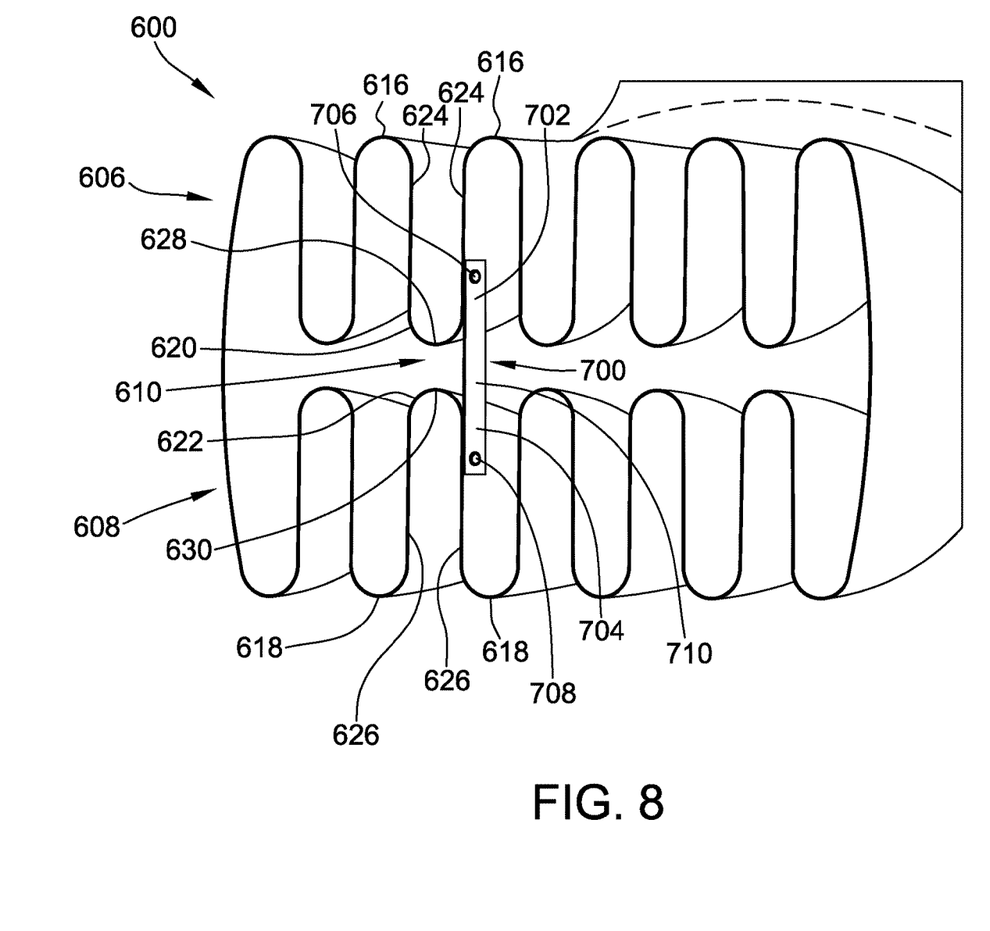
FIG. 8 is a perspective view of another alternative flow mixer including another alternative stiffener embodiment.

FIG. 8 illustrates another alternative implementation of a flow mixer 600 for use in exhaust system 114 (shown in FIG. 3) that includes an alternative implementation of a stiffener mechanism 700. Flow mixer 600 is substantially similar to flow mixer 200 (shown in FIG. 4 and FIG. 5) and flow mixer 400 (shown in FIG. 7) in operation and structure, with the exception that stiffener mechanism 700 extends between sidewalls of corresponding lobes, rather than corresponding troughs, as stiffener mechanism 300 (shown in FIG. 5 and FIG. 6) and stiffener mechanism 500 (shown in FIG. 7). As such, components of flow mixer 600 shown in FIG. 8 are labeled with similar reference numbers as those used in FIGS. 4-6 with the exception that the reference numbers are in the 600 series. Flow mixer 600 with stiffener mechanism 700 may be substituted for either of flow mixers 200 and 400 with stiffener mechanism 300 and 500, respectively, within exhaust system 114.

In the implementation shown in FIG. 8, flow mixer 600 is fabricated from at least one of a metallic material, such as a metal alloy, and a ceramic matrix composite (CMC) material and is able to repeatedly withstand exposure to hot exhaust gases 122. Flow mixer 600 includes a plurality of upper lobes 606 and a plurality of lower lobes 608 that are spaced from one another to define a gap 610 therebetween. As described above, upper lobes 606 include upper troughs 620 and lower lobes 608 include lower troughs 622. In the exemplary embodiment, upper lobes 606 also include a plurality of sidewalls 624 that are oriented substantially vertically and are parallel each adjacent sidewall 624. Each trough 620 extends between an adjacent pair of sidewalls 624 such that an upper peak 616 and an adjacent upper trough 620 share a common sidewall 624. Similarly, with respect to lower lobes 608, each trough 622 extends between an adjacent pair of sidewalls 626 such that a lower peak 618 and an adjacent lower trough 622 share a common sidewall 626.

In the exemplary implementation flow mixer 600 is configured such that each upper lobe 606 is oriented with a corresponding lower lobe 608. More specifically, an apex 628 of each upper trough 620 is aligned with an apex 630 of a corresponding lower trough 622 such that apexes 628 and 630 are spaced apart by gap 610. Because upper troughs 620 are aligned with a corresponding lower trough 622, it follows that each upper sidewall 624 is aligned with a corresponding lower sidewall 626.

Stiffener mechanism 700 is coupled between an upper lobe 606 and a corresponding lower lobe 608, and, more specifically, between an upper sidewall 624 and a corresponding lower sidewall 626. In such a configuration, stiffener mechanism 700 restricts movement of upper and lower lobes 620 and 622 with respect to each other.

In the implementation shown in FIG. 7, stiffener mechanism 700 includes an upper end 702 that is coupled to upper sidewall 624 and a lower end 704 that is coupled to a corresponding lower sidewall 626. An upper fastener 706 is inserted through an opening in upper end 702 and another opening formed in upper sidewall 624. Similarly, a lower fastener 708 is inserted through an opening in lower end 704 and another opening formed in lower sidewall 626. In such a configuration, a body portion 710 of stiffener mechanism 700 spans gap 610 between upper and lower troughs 620 and 622. As each of fasteners 706 and 708 are oriented substantially perpendicularly to respective sidewalls 624 and 626, fasteners 706 and 708 are subjected to primarily shear loading when upper and lower lobes 606 and 608 are subjected to stresses that would cause deflections if not for stiffener mechanism 700.

In the implementation shown in FIG. 8, stiffener mechanism 700 is fabricated from a CMC material that is able to repeatedly withstand exposure to hot exhaust gases 122. In another suitable implementation, stiffener mechanism 700 is fabricated from a metallic or metal alloy material. Generally, stiffener mechanism 700 may be fabricated from any material that facilitates operation of exhaust system 114 (shown in FIG. 3) as described herein. In embodiments where stiffener mechanism 700 and flow mixer 600 are both fabricated from a metallic material, stiffener mechanism 700 may be welded to flow mixer 600 instead of or in addition to using fasteners 706 and 708. Additionally, in such a welding implementation, stiffener mechanism 700 may extend between apexes 628 and 630. Furthermore, stiffener mechanism 700 may be adhesively bonded between lobes 606 and 608. Generally, stiffener mechanism 700 may be coupled between lobes 606 and 608 in any manner that facilitates operation of flow mixer 600 as described herein.

The examples described herein include a system or apparatus that is able to raise the natural frequency of a flow mixer in order to avoid the resonant frequencies of rotor operation. The examples described herein include flow mixers that include a plurality of lobes for mixing of a hot exhaust air stream and a relatively cooler ambient air stream. The flow mixers include a stiffener mechanism that extends between the upper and lower lobes and is configured to prevent deflections of the lobes due to vibrational stresses and resonant frequencies. In one implementation, the stiffener mechanism includes caps positioned within corresponding upper and lower lobe troughs and a body portion that extends between the troughs and is coupled to each of the caps. In such a configuration, the stiffener mechanism is loaded primarily with tension/compression forces during operation. In another implementation, the stiffener mechanism is integrally formed between the upper and lower lobes of the flow mixer. In yet another implementation, the stiffener mechanism is coupled to corresponding sidewalls of the lobes such that the stiffener mechanism is loaded primarily with shear forces during operation.

The implementations described herein facilitate raising the natural frequency of the flow mixer and preventing deflection of the flow mixer lobes due to aligning resonant frequencies and rotor vibrations. Such stiffening enables the use of larger size mixers that provide more efficient flow mixing and also lengthens the service lifetime of the flow mixer due to less material fatigue. As such, the costs associated with manufacturing and maintaining multiple flow mixers is reduced. Additionally, the stiffening creates a more constant lobe area, which facilitates more efficient flow mixing, and maintains the aerodynamic shape and properties of the flow mixer.

Although specific features of various examples of the invention may be shown in some drawings and not in others, this is for convenience only. In accordance with the principles of the invention, any feature of a drawing may be referenced and/or claimed in combination with any feature of any other drawing.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft exhaust system comprising:
   a flow mixer comprising:
      a plurality of first lobes, wherein at least one first lobe comprises a pair of opposing first sidewalls and a first trough extending between said pair of opposing first sidewalls; and
      a plurality of second lobes, wherein at least one second lobe comprises a pair of opposing second sidewalls and a second trough extending between said pair of opposing second sidewalls, wherein each second trough is aligned with and spaced a distance from a corresponding first trough; and
   a stiffener mechanism integrally formed with said flow mixer from a ceramic matrix composite (CMC) material and extending linearly between an apex of a first lobe, of the plurality of first lobes, and an apex of a second lobe, of the plurality of second lobes, in at least one pair of corresponding first lobe and second lobe such that said stiffener mechanism is configured to restrict movement of said first lobe and said second lobe, said stiffener mechanism comprising:
      a first end portion integrally formed with a bottom surface of the apex of said first lobe;
      a second end portion integrally formed with a top surface of the apex of said second lobe;
      a body portion integrally formed with said first end portion and said second end portion; and
      a pair of spacers coupled between said body portion and each of the at least one first lobe and the at least one second lobe.

2. The aircraft exhaust system according to claim 1, wherein said stiffener mechanism, said plurality of first lobes, and said plurality of second lobes are formed from a same material.

3. The aircraft exhaust system according to claim 1, further comprising a layer of skin laid over a first portion of a trough of the at least one first lobe, a first side of said body portion, and a first portion of a trough of the at least one second lobe.

4. The aircraft exhaust system according to claim 3, further comprising a second layer of skin laid over a second portion of the trough of the at least one first lobe, a second side of said body portion, and a second portion of the trough of the at least one second lobe.

5. A method of increasing a resonant frequency of a flow mixer that includes a plurality of lobes that each includes a trough and a pair of sidewalls, said method comprising:
   integrally forming a first end portion of a stiffening mechanism with a bottom surface of an apex of a first lobe of the plurality of lobes during a lay-up process;
   integrally forming a second end portion of the stiffening mechanism with a top surface of an apex of a second lobe of the plurality of lobes during the lay-up process; and
   integrally forming a body portion of the stiffening mechanism with the first end portion and the second end portion during the lay-up process such that the body portion restricts movement of the first and second lobes, wherein the body portion extends linearly between the apexes of the first lobe and the second lobe.

6. The method in accordance with claim 5, further comprising forming the stiffener mechanism and the plurality of lobes from a same material.

7. The method in accordance with claim 6, further comprising forming the stiffener mechanism and the plurality of lobes from a ceramic matrix composite (CMC) material.

8. The method in accordance with claim 5, coupling a pair of spacers coupled between the body portion and each of the first and second lobes.

9. The method in accordance with claim 5, further comprising laying-up a layer of skin over a first portion of a trough of the first lobe, a first side of the body portion, and a first portion of a trough of the second lobe.

10. The method in accordance with claim 9, further comprising laying-up a second layer of skin over a second portion of the trough of the first lobe, a second side of the body portion, and a second portion of the trough of the second lobe.

11. An aircraft exhaust system comprising:
a flow mixer comprising:
  a plurality of first lobes, wherein at least one first lobe comprises a pair of opposing first sidewalls and a first trough extending between said pair of opposing first sidewalls; and
  a plurality of second lobes, wherein at least one second lobe comprises a pair of opposing second sidewalls and a second trough extending between said pair of opposing second sidewalls, wherein each second trough is aligned with and spaced a distance from a corresponding first trough; and
a stiffener mechanism integrally molded with said flow mixer from a metallic or metal alloy material and extending linearly between an apex of a first lobe, of the plurality of first lobes, and an apex of a second lobe, of the plurality of second lobes, in at least one pair of corresponding first lobe and second lobe such that said stiffener mechanism is configured to restrict movement of said first lobe and said second lobe, said stiffener mechanism comprising:
  a first end portion integrally molded with a bottom surface of the apex of said first lobe;
  a second end portion integrally molded with a top surface of the apex of said second lobe;
  a body portion integrally molded with said first end portion and said second end portion; and
  a pair of spacers coupled between said body portion and each of the at least one first lobe and the at least one second lobe.

12. The aircraft exhaust system according to claim 11, wherein said stiffener mechanism, said plurality of first lobes, and said plurality of second lobes are formed from a same material.

13. The aircraft exhaust system according to claim 11, further comprising a layer of skin laid over a first portion of a trough of the at least one first lobe, a first side of said body portion, and a first portion of a trough of the at least one second lobe.

14. The aircraft exhaust system according to claim 13, further comprising a second layer of skin laid over a second portion of the trough of the at least one first lobe, a second side of said body portion, and a second portion of the trough of the at least one second lobe.

* * * * *